United States Patent [19]

MacKay

[11] Patent Number: 4,671,317
[45] Date of Patent: Jun. 9, 1987

[54] WATER SUPPLY SYSTEMS

[76] Inventor: Donald H. C. MacKay, 6 Parnell Street, Lower Hutt, New Zealand

[21] Appl. No.: 841,834

[22] Filed: Mar. 20, 1986

[51] Int. Cl.⁴ ............................................. F16K 31/34
[52] U.S. Cl. ..................................... 137/411; 137/414
[58] Field of Search ................................. 137/411, 414

[56] References Cited

U.S. PATENT DOCUMENTS

| | | | |
|---|---|---|---|
| 174,420 | 3/1876 | Haerle | 137/411 |
| 527,346 | 10/1894 | Rayner | 137/411 |
| 2,619,122 | 11/1952 | Hunter | 137/414 X |
| 4,173,255 | 11/1979 | Kramer | 137/411 X |

Primary Examiner—Robert G. Nilson
Attorney, Agent, or Firm—Oblon, Fisher, Spivak, McClelland & Maier

[57] ABSTRACT

A water supply system for supplying water at a substantially constant low pressure. The system includes a reservoir with an inlet for high pressure water and an outlet for lower pressure water. An equalising valve assembly is coupled to the inlet. The valve assembly has a plurality of passages each of which is individually closed or opened by controlled valve means according to prescribed water level limits in the reservoir. The passages can be progressively opened so as to admit high pressure water to the reservoir on low pressure water draw off and can be progressively closed as the reservoir is filled.

10 Claims, 10 Drawing Figures

WATER SUPPLY SYSTEMS

FIELD OF THE INVENTION

This invention relates to water supply systems and is particularly concerned with the provision of a water supply system supplying water at substantially constant low pressure.

BACKGROUND OF THE INVENTION

Water supply systems for domestic and commercial use may be high or low pressure water systems, and actual water pressures in both types of systems may vary considerably at divers times according to water draw off. In many applications, commercial and domestic, and for example for particular appliances such as solar water heating systems, variation in water draw off supply pressure is undesirable and may be detrimental to the operation of the apparatus concerned. It is frequently desirable also to have a low pressure water system when the only available supply source is a high pressure water supply system. For example the present invention may be invaluable in a low pressure solar water supply installation where the head or pressure of an existing supply is often higher than is desirable for efficient operation of the collector for the solar system.

OBJECTS OF THE INVENTION

Accordingly, an object of this invention is to provide a water supply system by which water at a higher pressure may be admitted and the outlet to the system provides water at a substantially constant low pressure.

Water hammer is a frequent problem in high pressure water systems, and another object of the invention is to provide an arrangement alleviating the likely occurrence of noisey and possibly damaging 'water hammer' in a system receiving a fluctuating water pressure and required to supply water at a substantially constant lower pressure.

Other and more particular objects and advantages of the present invention will become apparent from the ensuing description.

SUMMARY OF THE INVENTION

According to this invention therefor, there is provided an equalising valve assembly for a water supply system for supplying water at substantially constant low pressure. The system has a reservoir with an inlet for water supplied at a pressure higher than atmospheric pressure and an outlet for the lower constant pressure water supply. The equalising valve assembly is arranged to be coupled to the inlet so as to control the admission of water at the higher pressure to the reservoir. The equalising valve assembly comprises a body arranged for partial closure of the inlet but having a plurality of passages through which incoming water at the higher pressure can pass into the reservoir. A pressure actuated control means within the body is arranged to progressively and invidividually open and close ports of the passages according to variations in water draw off from the reservoir to maintain substantially constant water levels between prescribed limits within the reservoir.

The invention further provides a water supply system incorporating the equalising valve of the preceding paragraph.

BRIEF DESCRIPTION OF THE DRAWINGS

Some preferred aspects of the invention may be described by way of example and with reference to the accompanying drawings, in which.

DETAILED DESCRIPTION OF THE PRESENTLY PREFERRED EMBODIMENT

It will be appreciated that the water system in accordance with this invention is not restricted to any particular size and may be made large or small, the reservoir holding any prescribed amount of water, according to a user's requirements. However, a principal aim of the present invention is to make the supply system compact complete and utilising a minimum of parts, so that the product is readily handled and installed, occupies a minimum of space for storage and transportation purposes, and is capable of being manufactured and sold at a relatively low cost; whilst at the same time the system is versatile and efficient in operation and requires little or no survellance or maintenance and servicing once installed as a sealed unit.

Figure 1:
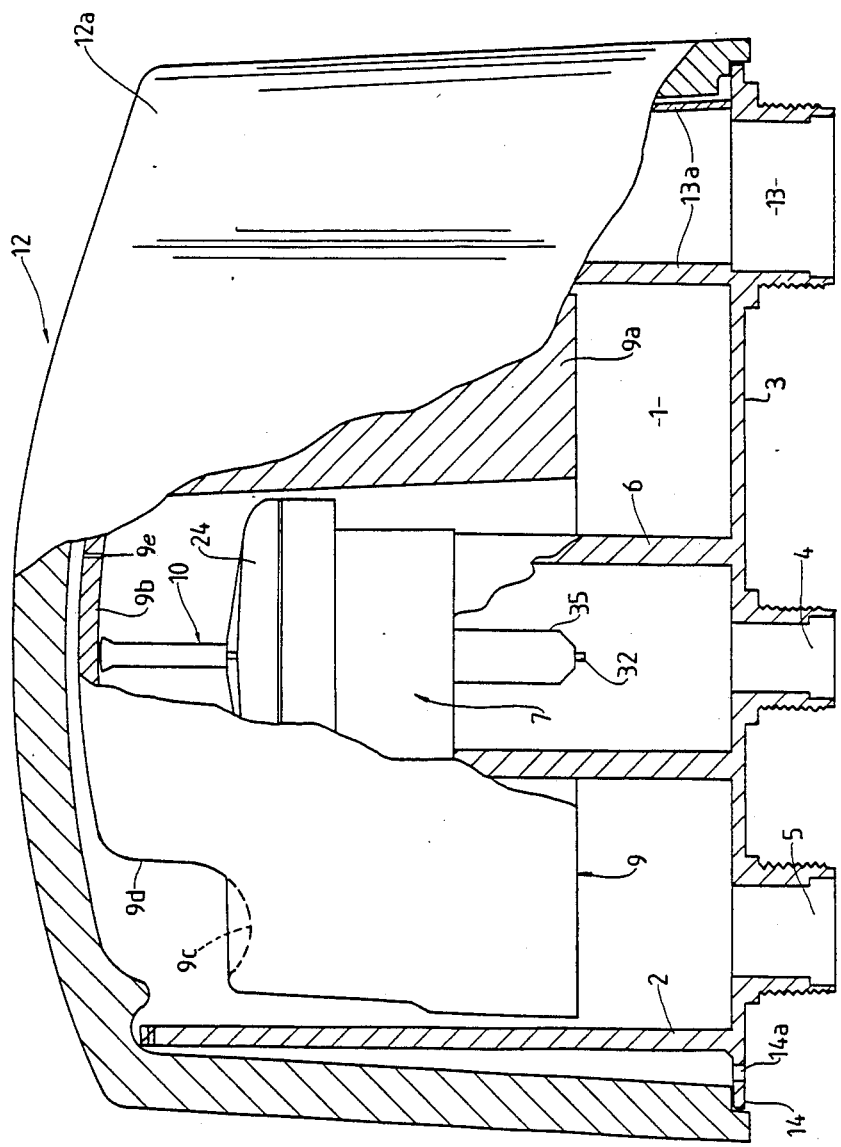
FIG. 1 is an assembled part-broken view of one form of the system in accordance with the invention.
Figure 2:
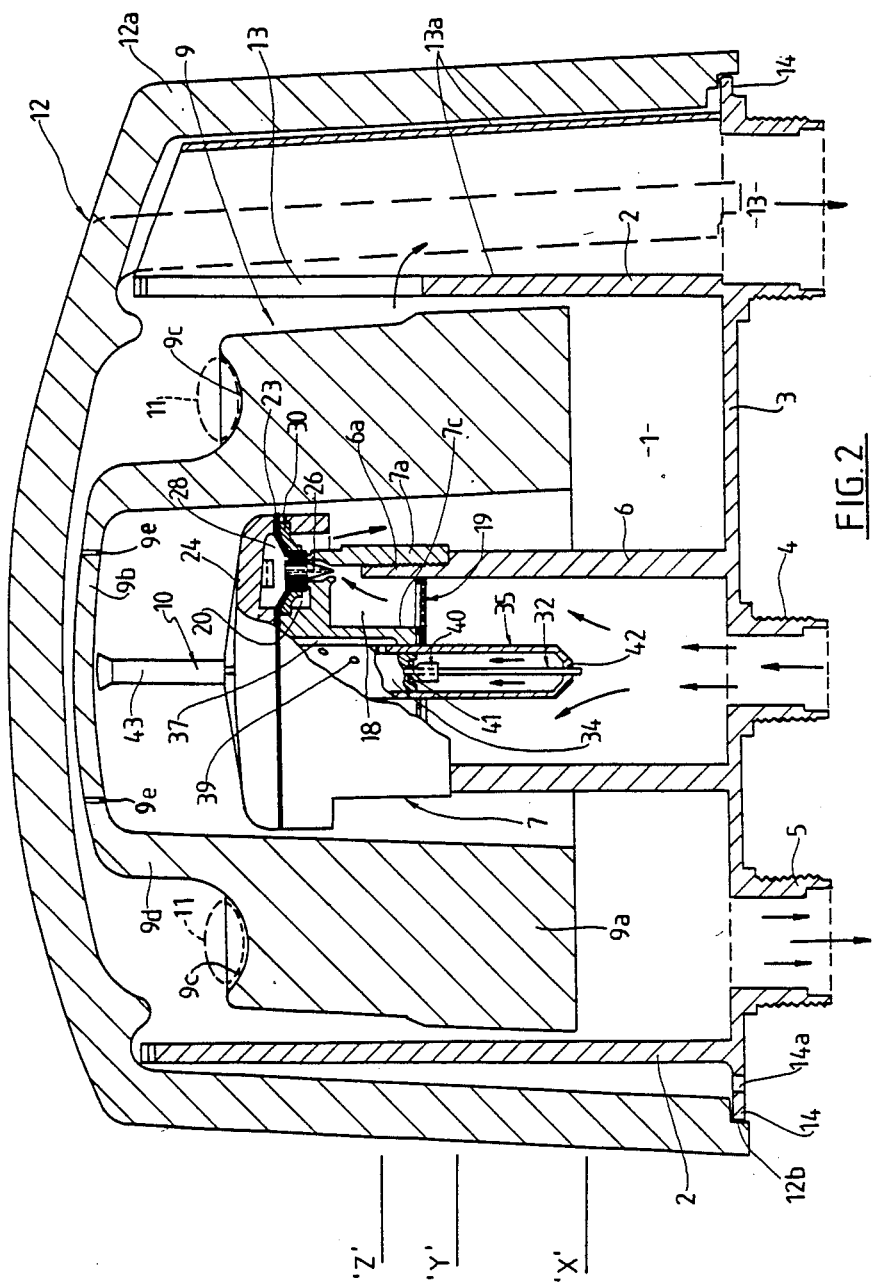
FIG. 2 is a further part-broken and sectioned view of the complete system of FIG. 1.
Figure 3:
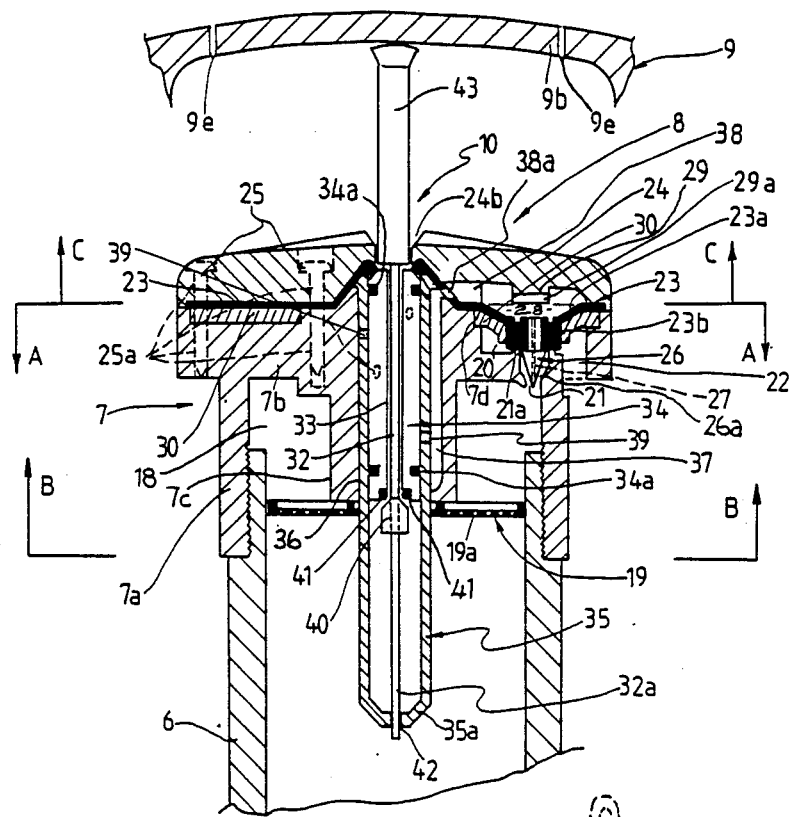
FIG. 3 is a fully sectioned view (on a slightly larger scale) of one preferred form of the principal equalising valve assembly of the invention shown in the static position.

The apparatus is constructed predominently, preferably, from plastics materials. In the presently preferred embodiment depicted in the drawings, a reservoir 1 may be made of moulded or fabricated rigid plastics materials with a cylindrical upright wall part 2 and a horizontal substantially flat base 3 through which a water inlet connection 4 and a water outlet connection 5 extend. Preferably the water inlet connection 4 is centrally disposed and extends co-axially into an inner upright tubular part 6 within the reservoir 1. The inner upright tubular part 6 has an upper screw-threaded end portion 6a (see FIG. 2) with which a complementary screw-threaded lower boss or collar portion 7a of a main valve body 7 of an equalising valve assembly 8 (see FIG. 3) can be engaged to locate the equalising valve assembly 8 co-axially of the unit. The main valve body 7 is also cylindrical (either for its full length or of stepped cylindrical form, as shown, with the upper part of larger diameter).

A float member 9 may be in the form of an inverted cup located as a relatively close fit over the main valve body 7 and within the cylindrical upright wall part 2. The float member 9 can be manufactured from a material such as a high density polyurethane foam material so as to have a thick outer wall 9a forming the main body of the float member 9 and a transverse upper wall 9b the lower side of which is arranged to contact and move a pressure relief valve 10 which is part of the equalising valve assembly 8 when the float member 9 moves towards its lower level on water draw off from the reservoir 1. The upper side of the float member 9 is preferably provided with a weight recess 9c or plurality of weight recesses 9c so that weight members such as lead weight members 11 can be inserted therein for weighting of the float member 9 and adjustment of pressure balance according to the pressure of the water at the water inlet connection 4. The weight recess or recesses 9c can be of annular form to provide a central upstand 9d to the float member 9 facilitating gripping with the fingers of a person assembling, installing or servicing the system. The transverse upper wall 9b has at least one vent 9e.

The assembly is preferably provided also with a cover 12 which can be manufactured of a material such as a polyurethane foam for thermal insulation purposes. The cover 12 may be further coated with a protective coating such as a rubberised coating (e.g., a Monolar (Registered Trade Mark) rubberised coating) to prevent the polyurethene (or polystyrene) plastics cover 12 from breaking down in adverse weather conditions. The reservoir 1 is also provided with an overflow outlet 13 opening to the upper end thereof. The overflow outlet 13 may be connected to a conduit 13a separately formed and attached to the reservoir 1 or formed in the moulding thereof so that overflow water, in the event of the equalising valve assembly cut-off arrangement not operating correctly, may be directed to waste or to an overflow tray or receiving drain or may be returned to a supply source. The cover 12 may have a shaped extension part 12a to extend around and over the conduit 13a.

The horizontal substantially flat 3 of the reservoir 1 may extend beyond the cylindrical upright wall part 2 to provide an annular flange 14. The annular flange can be provided with a plurality of spaced apertures 14a to enable fixing of the reservoir 1 and the system as a whole to any supporting bracket or other fixture or structure (not shown). The cover 12 may have a lower peripheral edge portion 12b recessed to accommodate the annular flange 14 in maintaining the cover 12 as a relatively close fit over the reservoir 1 and the flange 14 for good insulation and to prevent leaves and dirt etc. entering the reservoir 1 from outside. Unemployed flange holes 14a provide access for air to the cover 12 and upper side of the reservoir 1 and prevent suction hampering water flow from the unit via the water outlet connection 5.

As an example of dimensions, in one form of the invention the reservoir 1 may be in the region of only 200 to 300 millimeter in diamter and 100 to 200 millimeters in height, with the arrangement of the float member 9 and equalising valve assembly 8 providing for a normal maximum water height of approximately one-half the height of the reservoir 1 and a water fall of not more than 25 to 30 millimeters before the equalising valve assembly 8 reaches the fully open position for maximum inflow of water. The arrangement is such that the equalising valve assembly 8 is re-actuated and progressively opened to permit ingress of the higher pressure water as soon as water is drawn off and the float member 9 commences to fall—e.g. a 1 mm fall will permit initial ingress of water. The water inlet connection 4 may be sized and shaped to connect to a 14 millimeter or 19 millimeter inside diameter pipe supplying the higher pressure water, and the water outlet connection 5 for water draw-off may be sized and shaped to connect to a 25 millimeter inside diameter pipe. The float member 9 and the equalising valve assembly 8 are arranged and dimensioned to occupy a major portion of the total capacity of the reservoir 1 (e.g., in excess of two-thirds), and thus a very compact assembly is provided.

Figure 10:
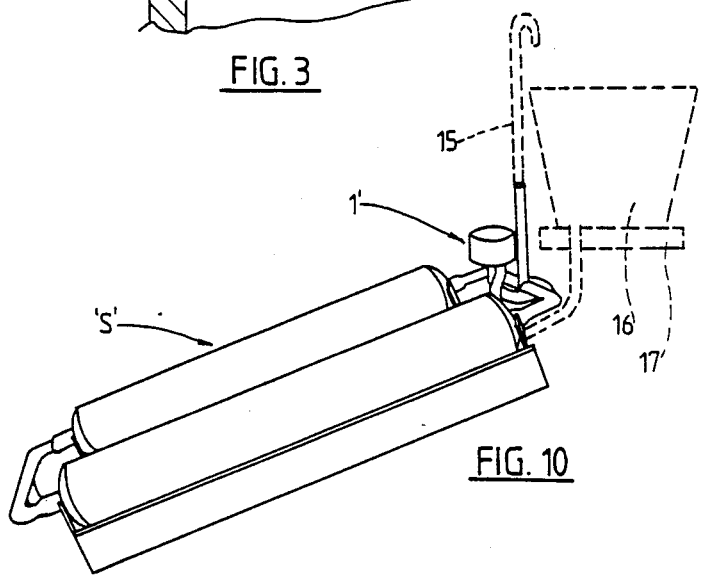
FIG. 10 is an example of a typical application of the present invention to a solar heating water system.
Figure 4:
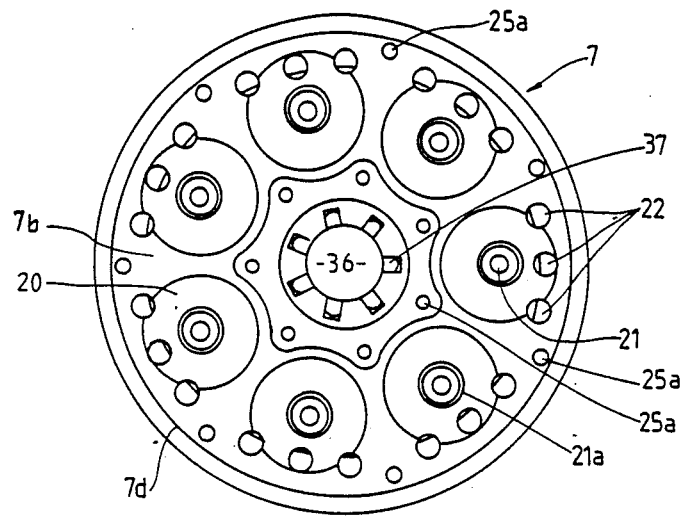
FIG. 4 is a plan view of one form of a valve body of and removed from the equalising valve assembly, as viewed in the direction of arrows A—A in FIG. 3.
Figure 5:
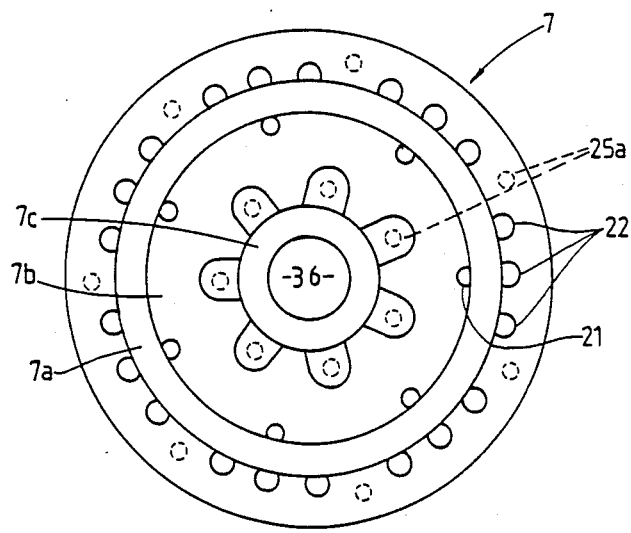
FIG. 5 is an underside view of the valve body of FIG. 4, as viewed in the direction of arrows B—B of FIG. 3.
Figure 6:
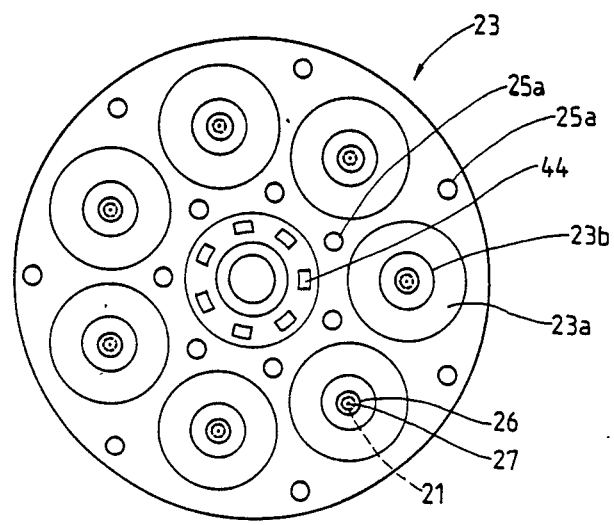
FIG. 6 is an underside view of a diaphragm valve assembly of and removed from the equalising valve assembly, as viewed in the direction of arrows C—C in FIG. 3.
Figure 9:
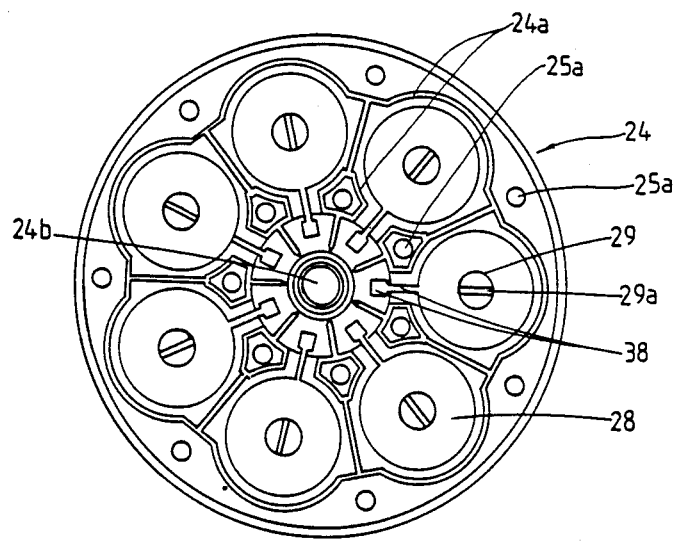
FIG. 9 is an underside view of a capping part of the valve body, removed from the equalising valve assembly and as viewed in the direction of arrows C—C in FIG. 3.
Figure 7:
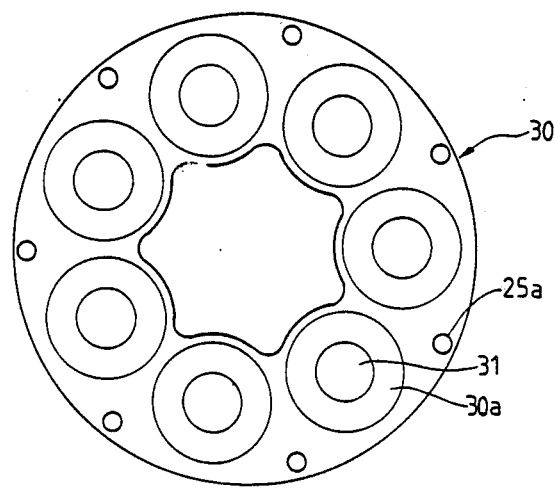
FIG. 7 is a plan view of a support plate member for the diaphragm valve assembly removed from the equalising valve assembly and as viewed in the direction of arrows A—A of FIG. 3.
Figure 8:
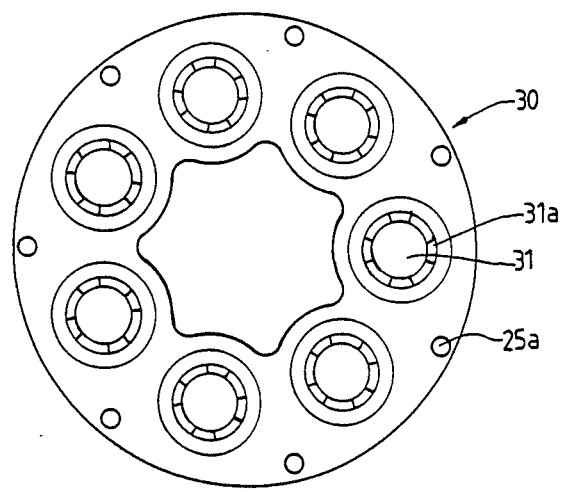
FIG. 8 is an underside view of the support plate member of FIG. 7, as viewed in the direction of arrows C—C of FIG. 3.

In many domestic and like solar water heating installations, the collector unit (as exampled at 'S' in FIG. 10) is located on the roof of a building and may be in relatively close proximity to the main hot water header tank in the roof. It and it is frequently a requirement that there be either a tall stand pipe, a header pipe 15, or a further header tank 16 (as indicated in broken outline in FIG. 10) for the system. As will be appreciated, the header pipe 15 and/or the further header tank 16 may be unsightly and will require the addition of a covering and a very strong supporting structure 17. By the present invention, the water pressure conversion unit generally indicated at 1' may sit neatly and unobtrusively adjacent the solar water system 'S', coupled in line therewith. The most important part of the present invention involves the construction and operation of the equalising valve assembly 8, and reference is now made particularly to FIGS. 3 to 9 inclusive for a more detailed description of the preferred aspects of the present invention.

Simple diaphragm shut-off valves are commonly provided to prevent and restrict such as water flow, with a flexible diaphragm member closing on or opening away from one or more water flow openings, according to pressure on either side of the valve. The present invention goes further by employing a diaphragm type of valve arrangement incorporating bleed means to initiate action and further providing for progressive individual opening and closing of water passages to stabilise water pressure and more positively regulate flow to eliminate or substantially alleviate water hammer, such as frequently occurs in high pressure water and fluctuating pressure water systems.

Accordingly, in the present invention the main valve body 7 (shown particularly in FIGS. 3, 4 and 5) has an upper transverse wall part 7b from which the lower boss or collar part 7a depends for screw-threaded engagement with the inner upright tubular part 6 of the reservoir 1'. A central co-axial part 7c depends frm the upper transverse wall part 7b to form an annular space 18 between the central co-axial part 7c and the collar portion 7a and between the central co-axial part 7c and the upper screw-threaded end portion 6a for the inflow of the higher pressure water to the equalising valve assembly 8.

Preferably an annular disc-like filter an flow diffuser member 19 is mounted at the lower end of the main valve body 7 within the upper end portion 6a of the inner upright tubular part 6 to prevent extraneous matter in the water inlet supply entering the equalising valve assembly 8, to further diffuse the high pressure flow of incoming water, and to facilitate the smooth operation of the equalising valve assembly 8. The filter and flow diffuser member 19 may take various forms and can, for example, be made of a simple metal mesh form. Alternatively, the filter and flow diffuser member 19 can be specially fabricated (e.g., such as by injection moulding from a suitable rigid setting high quality plastics material) with a plurality of perforations, preferably in the form of a plurality of co-axial annular slots 19a (conjoined for strength at intervals by radial rib parts). The co-axial annular slots 19a (or perforations if provided are preferably) of substantially V-shape in cross-section, with the wider open side uppermost to prevent the entrapment of dirt particles or other extraneous matter on the pressure side of the system and blocking of the filter and flow diffuser member 19.

In the preferred construction, the upper transverse wall part 7b of the main valve body 7 is of larger diameter than the lower tubular collar portion 7a so as to project laterally therefrom. The upper side of the upper transverse wall part 7b is provided with a plurality of equally spaced, substantially circular recesses 20 located on the same concentric axis near, but to the inner side of, the junction between the lower collar portion 7a and the upper transverse wall part 7b. Each recess 20 is provided with a co-axial bore 21 opening to the inner side of the lower collar portion 7a and thus to incoming water under higher pressure in the inner upright tubular part 6 of the water inlet connection 4. At least one, but preferably a plurality (e.g., three), of outer apertures 22 open to the outer under side of the lower collar portion 7a and thus communicating with the interior of the reservoir.

Because of the co-axial bores 21 and the outer apertures 22, unrestricted water can flow from the inlet connection 4 through the inner upright tubular part 6, the filter and flow diffuser member 19, and the lower collar portion 7a, and into the reservoir 1. However, the co-axial bores 21 open to valve seats 21a within the circular recesses 20. The valve seats 21a are capable of being closed individually by valve parts 23a of a unitary diaphragm valve assembly 23 (see FIGS. 3 and 6). The unitary diaphragm valve assembly 23 is clamped in position between the lower colloar portion 7a and an upper capping part 24 (see FIGS. 3 and 9), such as by securing screws 25 located in aligned holes 25a in the upper capping part and in the upper transverse wall part 7b. The holes 25a in the upper transverse wall part 7b are screw-threaded to receive the securing screws 25.

The unitary diaphragm valve assembly 23 comprises a circular (in plan) member constructed primarily of a natural or synthetic rubber material. The circular member is preferably pre-shaped with a plurality of frusto-conical valve parts 23a dimensioned and positioned so as to locate over and project downwardly into a corresponding one of the circular recesses 20 in the upper transverse wall part 7b. The valve parts 23a are shaped so that the lower end portions of each frusto-conical valve part 23a is a thickened depending cylindrical valve part 23b capable of engaging and sealing on the associated valve seat 21a, which may be in the form of an inner annular upstanding lip.

Each thickened depending cylindrical valve part 23b is provided with a fine bleed means for a purpose hereinafter described. In one preferred form of the invention and as illustrated, each thickened depending cylindrical valve part 23b is fitted with a nipple insert 26 of a hard plastics material such as a nylon. Each nipple insert 26 has a depending co-axial conical head 26a projecting into the associated co-axial bore 21. The depending co-axial heads 26a bore correct location of the thickened depending cylindrical valve parts 23b on their associated valve seats 21a and reinforce the frusto-conical valve parts 23a against distortion to lessen the risk of leakage). A fine co-axial bleed bore 27 extends fully through each nipple insert 26 to provide communication between the inner side of the lower collar portion 7a and the upper side of the unitary diaphragm valve assembly 23 below the capping part 24.

The upper capping part 24 is provided on its underside with a plurality of recesses 28 complementary to and alignable with the circular recesses 20 in the upper transverse wall part 7b and the frusto-conical valve parts 23a. Each recess 28 is provided with a co-axial depending abutment 29 against which the upper central portion of the frusto-conical valve part 23a and the upper end of the nipple insert 26 can abut to restrict upward movement thereof whilst permitting water and/or air flow in the annulus formed about the co-axial depending abutment 29 within each recess 28. The co-axial depending abutment 29 may be provided with a medial transverse open-ended slot 29a which alignswith the bleed bore 27 in the nipple insert 26 so that liquid or air flow therethrough is not restricted at any time.

Further reinforcement or support and stabilizing of the frusto-conical valve parts 23a at the circular recesses 20 and the co-axial bores 21 can be provided by way of an intermediate diaphragm support plate 30 (see now FIGS. 3, 7 and 8) in the form of an annular disc like member which locates within a concentric annular recess 7d in the upper side of the upper transverse wall part 7b over the individual circular recesses 20. The diaphragm support plate 30 is provided with a plurality of equally spaced apertures 31 positioned on a concentric pitch circle and corresponding in number to the number of the co-axial bores 21 and the circular recesses 20. Each of the apertures 31 has a diameter such that the associated thickened depending cylindrical valve parts 23b of the unitary diaphragm valve assembly 23 can slidably locate therein and be maintained in the correct position on its respective valve seat 21a. The upper side of the diaphragm support plate 30 may be provided with a conical recess 30a at each aperture 31 conforming to the normal configuration of the frusto-conical valve part 23a engageable therewith. Part cylindrical gapped projections 31a may extend below the apertures 31 as extensions thereof supporting the associated thickened depending cylindrical valve parts 23b through the major part of its movement. Because of the spaces between the part cylindrical gaping projections 31a, the lower ends of the part cylindrical gapped projections 31a may contact the associated valve seat 21a without restricting water flow through the co-axial bores 21, the outer apertures 22, or the circular recesses 20 in the upper transverse wall part 7b when the thickened depending cylindrical valve parts 23b are open.

To prevent lateral water leakage across the unitary diaphragm valve assembly 23 between the frusto-conical valve parts 23a and to ensure good sealing elsewhere, the upper capping part 24 can be provided on its underside with a uniform height continuous small projecting rib (see FIG. 9) which presses tightly into the unitary diaphragm valve assembly 23 when sandwiched between the main valve body 7, the diaphragm support plate 30, and the upper capping part 24.

As previously mentioned, the equalising valve assembly 8 further includes the pressure relief valve 10. The pressure relief valve 10 comprises a vertically and co-axially disposed needle valve having a stem 32 located in a clearance co-axial bore 33 in a cylindrical piston member 34 for limited vertical movement within the cylindrical piston member 34. The cylindrical piston member 34 in turn is slidably located and sealed within a co-axial cylindrical tube piston sleeve 35 mounted within a co-axial bore 36 in the central co-axial part 7a c and depending downwardly therefrom into the inner upright tubular part 6. The co-axial bore 36 in the main valve body 7 in which the piston sleeve 35 is located is provided with a plurality of parallel vertically and longitudinally positioned channels 37 corresponding to the number of the frusto-conical valve parts 23a and the circular recesses 20. The channels 37 are closed at their lower ends and open at their upper ends for communication with aligned apertures 38a in the unitary diaphragm valve assembly 23 and channels 38 in the upper capping part 24. The channels 38 in turn provide communication with the associated recesses 28 in the upper side of the frusto-conical valve parts 23a.

The piston sleeve 35 is provided along its length with a plurality of small flow control apertures 39 corresponding in number to and aligned with the longitudinally positioned channels 37 within the main valve body 7 and within the confines of the cylindrical piston member 34 when in its uppermost position. The cylindrical piston member 34 is an elongate member with upper and lower seal rings 34a positioned such that, when the cylindrical piston member 24 is in the normal uppermost position shown in FIG. 3, the flow control apertures 39 in the piston sleeve 35 are located between the sealing rings 34a to prevent the passage of air therethrough. However, when the cylindrical piston member 34 is in its lowest position (i.e., when the reservoir 1 is empty or nearly empty) and the float member 9 is at its lowest position, causing the pressure relief valve 10 to be moved to its lowest position, the flow control apertures 39 in the piston sleeve 35 are open to atmosphere.

The pressure relief valve 10 has its stem 32 extending longitudinally through the cylindrical piston member 34 as aforesaid. A valve member 40 is located on the stem 32 at the lower end of the cylindrical member 34 34. The valve member 40 is capable of sealing against a valve seat such as an O-ring seal 41 about the clearance co-axial bore 33 in the cylindrical piston member 34. The lower end part 32a of the stem 32 may project downwardly and through a clearance aperture 43 in an otherwise closed lower end 35a of the piston 35. The diameter of the clearance aperture being selected to permit water under pressure to bleed through the annular space between the stem 32 and the piston sleeve 35 but being fine enough to prevent the passage of unwanted extraneous matter or dirt particles.

An enlarged pin or start-cap extension 43 projects upwardly from the upper end of the stem 32 above the cylindrical piston member 34 and through a central clearance apertures in the unitary diaphragm valve assembly 23 and a corresponding central clearance aperture 24b (see FIG. 9) in the upper capping part 24. The upper end of the enlarged pin 43 can freely abut the inner under side of the float member recess 9c. Accordingly, the float member 9 is free to move upwardly on filling the reservoir 1 with water and at the same time is arranged to engage the enlarged pin 43 to move the pressure relief valve 10 downwardly on any water draw-off and lowering of the float member 9 below the prescribed level. The arrangement is such that there need only be a small gap (e.g., in the region of a millimeter), between the upper side of the cylindrical piston member 34 and the lower end of the enlarged pin 43. Accordingly on initial downward movement of the float member 9 on water draw-off from the reservoir 1, the stem 32 and the attached valve member 40 will be moved fractionally downwardly sufficiently to open the lower end of the clearance co-axial bore 33 in the cylindrical piston member 34 to the water under pressure in the inner upright tubular part 6 and lower end 35a of the piston sleeve 35 to allow initial pressure release and actuation of the equalising valve assembly 8 as hereinafter described.

On initial installation of the apparatus in accordance with this invention, or commencement of use of the system with the reservoir 1 empty or nearly empty and with the float member 9 and pressure relief valve 10 at their lowest levels ("X" in FIG. 2 indicating low water level), on inflow of water under pressure via the water inlet connection 4 and into the inner weight tubular part 6, the water under pressure passes through the filter and flow diffuser member member 19 into the interior of the main valve body 7 within the lower collar part 7a. In the absence of any resistance to the upper side of the frusto-conical valve parts 23a, the water pressure lifts the frusto-conical valve parts 23a, in their respective circular recesses 20 clear of their respective valve seats 21a to permit the full flow of water through the co-axial bores 21 and the outer apertures 22 communicating with the respective circular recesses 20 to fill the reservoir 1.

At the same time, the initial water pressure will raise the valve member 40 to close on the O-ring seal 41 at the lower end of the cylindrical piston member 34 and to seal off clearance co-axial bore 33 in the cylindrical piston member 34. Thereupon the water under pressure acts on the lower side of the cylindrical piston member 34 to urge the pressure relief valve 10 upwardly so as to rise with the rising of the float member 9 as the reservoir 1 is filled, the upper end of the enlarged pin 43 abutting the underside of the float member 9 within its recess 9c.

Initially, there is no resistance by the unitary diaphragm valve assembly 23, as it is open to atmospheric air pressure communicating by way of the channels 37 and the flow control apertures 39, since the flow control apertures are initially located above the uppermost sealing ring 34a of the cylindrical member 34. Once the frusto-conical valve parts 23a are in the open position, they remain that way during filling of the reservoir 1 to the prescribed level. On the pressure relief valve 10 and the cylindrical piston member 34 rising with the float member 9, the piston sleeve flow control apertures 39 are progressively sealed off. At the same time, there is a slight bleed of water under pressure through the fine co-axial bleed bores 27 in the nippe inserts 26 into the recesses 28 above the frusto-conical valve parts 23a and within the upper capping part 24. This bleed continues until such time as the pressure above the frusto-conical valve parts 23a equalises with the pressure below and within the inner upright tubular part 6 and the valve seats 21a under the inherent spring influence of the diaphragm material. At that stage, the float member 9 and the equalising valve assembly 8 are in the static non-flow position shown in the drawings with water being at level Y within the reservoir 1. Level Z indicates the overflow position, in which excess water may pass through the overflow outlet 13. (This should rarely occur unless there is slowness in action in sealing of the equalising valve assembly 8 for some reason).

When low pressure water is drawn off through the water outlet connection 5 of the reservoir 1, the float member 9 commences to lower. When the float member 9 contacts the upper end of the enlarged pin 43 (there can be a small gap between the float member 9 and the enlarged pin 43 to allow "lost time" and to compensate for water evaporation etc. before commencement of refilling of the reservoir 1, and valve member 40 is opened initially. As previously mentioned, this can be within one millimeter of downward movement pressure relief valve 10. This allows water under pressure to pass through the clearance co-axial bore 33 of the cylindrical piston member 34 to the upper side of the frusto-conical valve parts 23a via the connecting channels 37,38 and the recesses 28.

In the illustrated form of the invention, the central part of the unitary diaphragm valve assembly 23 is of frusto-conical form and is located over the upper end of the piston sleeve 35 and between the central parts of the main valve body 7 and upper body capping part 24. Accordingly, appropriate communicating apertures 44 (see FIG. 6 can be provided in the unitary diaphragm valve assembly 23 communicating with the associated channels 37,38 and recesses 28.

The flow control apertures 39 in the piston sleeve 35 are equally spaced circumferentially but at different levels longitudinally of the piston sleeve 35 so that, as the cylindrical piston member 34 slides downwardly with the pressure relief valve 10 and within the piston sleeve 35, the flow control apertures 39 are gradually uncovered in sequence. Initially, when the uppermost flow control aperture 39 is exposed from sealing by the cylindrical piston member 34, the water in the corresponding recess 28 in the upper capping part 24 at the upper side of a first frusto-conical valve part 23a becomes exposed to normal air pressure through the central clearance aperture 24b in the upper capping part 24, thus relieving the pressure on the upper side and enabling water pressure from within the inner upright tubular part 6 to exert force on the under surface of the nipple insert 26 and the thickened depending cylindrical valve part 23b of the unitary diaphragm valve assembly 23 to permit water under pressure to pass through the communicating opening into the reservoir 1 for first trickle filling.

With greater water draw-off, the pressure relief valve 10 continues to lower, and the cylindrical piston member 34 sequentially exposes more of the flow control apertures 39 to atmosphere for progressive opening of the series of frusto-conical valve parts 23a to increase water flow into the reservoir 1. Accordingly, with full outlet flow and lowering of the water level to its lowest point, all the frusto-conical valve parts 23a are off their associated valve seats 21a, enabling full inlet water under pressure to be fed into the reservoir 1. This causes the float member 9 and the pressure relief valve 10 rise, progressively closing off the flow control apertures 39 for smooth operation of the system.

Whilst the flow control apertures 39 can be positioned in a spiral manner about the piston sleeve 35 so that the respective frusto-conical valve parts 23a are opened in directly adjacent series, preferably the arrangement provides for staggered formation of the flow control apertures 39 for staggered opening and closing of the frusto-conical valve parts 23a. If, for example there are, as illustrated, seven individual frusto-conical and valve parts 23a in the unitary diaphragm valve assembly 23, with equivalent numbers of the flow control apertures 39 and connecting channels 37 etc., and the parts are numbered 1 to 7 in series, the opening or closing sequence could be 1, 5, 2, 6, 3, 7, 4, or some other suitable staggered sequence.

Further, control of the water flow and valve actuation may be achieved by having different diameters for the co-axial bores 21 associated with different circular recesses 20 in the main body 7. For example, the diameters of the co-axial bores 21 may progressively increase equally in series, or in staggered relationship.

Experiments with prototype systems and equalising valve assemblies in accordance with this invention and as described and illustrated have proved highly successful in providing constant low pressure water supply from an originating higher pressure water supply, problem free and without the water hammer commonly experienced in conventional high pressure/low pressure water supply systems.

It will be appreciated that the system is not confined to one having the illustrated seven individual water passage and valve arrangement, but any number can be provided and may be preferred according to the required size and capacity of the system. Whilst the system may perform reasonably well in some situations with only 2, 3 or 4 water passage and valve arrangements, a higher number (e.g., 5, 6, 7 or 8) will generally provide for smoother and more effective operation.

Thus, by this invention, there is provided an improved and compact pressure adjusting system enabling water under high or uneven pressure at an inlet source to be converted to a substantially constant low pressure supply at the water outlet connection 5. The arrangement provides that the reservoir contains a relatively small amount of water, and discharge through the water outlet connection 5 of a small amount of water effects the required amount of float movement for actuation of the equalising valve assembly 8 so that there is a continual trickle or frequent intermittent supply of high pressure water, providing a constant supply of substantially constant low pressure outgoing water.

The preferred manufacture of the unit in plastics materials and with the preferred formed plastics cover 12 and float member 9 guard against freezing of the water in the system for most situations in which it is likely to be used. In the event of any freezing, there is little likelihood of the unit being damaged. Accordingly, the unit will operate effectively and efficiently again on thawing.

By the provision of a small and compact unit, and as before-mentioned, considerable advantages are gained in costs, transport and storage. Moreover, the unit or system is easily fitted and handled by a plumber.

It will be appreciated also that the use of the invention is not confined to solar water systems, but may have many other applications. It is envisaged for example that the invention may be particularly usefully employed in high rise building situations such as in large hotel, condominium, and apartment complexes served by main roof-top water header tank systems. In such complexes and systems, water supply pressures at the different floor levels will normally vary according to their height and relatively to the header tank system concerned. Morever, the water supply pressure will vary at the individual units of the complexes with water draw-off at other units. Accordingly, a single water supply system of the present invention can be installed at the various floor levels for supply of water to all or group of units on the respective floors, and/or individual supply systems can be provided for the units of a complex.

As previously indicated, the system of this invention is not restricted to any particular size, and the water pressure at the outlet side of the system can be readily varied accordingly to a user's requirements—for instance, by internal port and water passage size variation and the employment of interchangeable parts.

Further, the drawings and aforegoing description indicate the employment of a particular form of inverted cup-like float member 9 which locates over the equalising valve assembly 8 in providing one version of a complete compact system. It will of course be appreciated that an alternative float construction can be utilised and positioned adjacent or in some other position relative to the equalising valve assembly 8 and arranged to actuate the pressure relief and control valve means (i.e., to engage and move the enlarged pin 43 and the cylindrical piston member 34) directly or indirectly, such as by way of lever and/or linkage mechanism.

Particular forms of the invention have been described and illustrated by way of example, but it will be appreciated that other variations of and modifications to the invention can take place without departing from the scope of the appended claims.

We claim:

1. A water supply system for supplying water at substantially constant low pressure, said water supply system comprising a reservoir having an inlet for water supplied at a pressure higher than atmospheric pressure and an outlet for a lower consant pressure water supply; an equalising valve assembly coupled to said inlet and having a plurality of valve chambers and connecting passages within a body part of said assembly, said body part incorporating a pressure control valve means which is arranged to be progressively actuated and is opened on downward movement of a float member in said reservoir on the water level in said reservoir falling below a prescribed level; said control valve means including a slide valve subject to inlet water pressure and movable against such inlet water pressure by the falling of said float member to allow sequential opening of a valve member in each of said valve chambers so as to progressively permit water at the higher pressure to be admitted to said reservoir via the respective passages and connecting valve chambers of said equalising valve assembly, said slide valve of said pressure control valve means being arranged to progressively close under the inlet water pressure and on the volume of water and said float member in said reservoir rising to allow pressure build-up in said equalising valve assembly and progressive closure of the valve members to cut-off of water supply to said inlet and maintains substantially constant water levels between prescribed limits within said reservoir; each one of said valve chambers being divided into first and second chamber parts by divider means with each of said first chamber parts being arranged to provide communication between the associated passage of said body part and said reservoir for the passage of water, and each of said second chamber parts being arranged to be made open to atmospheric pressure by way of said slide valve when the water level in said reservoir is within prescribed limits, there being varying prescribed limits for the plurality of valve chambers and communicating passages; and there being bleed means between said first and second chamber parts of each valve chamber enabling the passage of a small proportion of the higher pressure inlet water to bleed from the first chamber part to the second chamber part of each valve chamber and subsequent equalising of pressure between said first and second chamber parts on sealing of said second chamber part from atmospheric pressure when the reservoir water level reaches or exceeds said prescribed limits, each of said valve members being closable under a bias to prevent water flow through the respective valve chamber and into said reservoir on equalising of pressure in the respective chamber first and second parts of that valve chamber.

2. A water supply system as claimed in claim 1 wherein said reservoir has a base part with a tubular upstand co-axially supporting said equalising valve assembly at its upper end and having the reservoir inlet opening to the lower end, and said float member is a weighted float member in the form of an annulus located above said upstand to have an upper transverse end part arranged to engage and control movement of a projection controlling operation of said slide valve of said equalising valve assembly on rise and fall of the water level in said reservoir.

3. A water supply system as claimed in claim 1 wherein said reservoir is in the form of a substantially cylindrical open topped vessel and has an outwardly directed peripheral support flange part at the base thereof, there being a substantially cylindrically walled cover member extending over said reservoir vessel in spaced relationship therefrom and supported at its lower end peripheral by said support flange part, said flange part being apertured for the admission of air to the reservoir.

4. A valve supply system as claimed in claim 3 wherein said slide valve of said pressure control valve means further comprises an elongate cylindrical piston member slidably located within a co-axial cylindrical bore of said body part, said bore being open to atmospheric pressure at one end and being substantially closed at the opposite end, said body part being provided with a plurality of further passages leading one each to said second chamber parts and to a further port opening through the cylindrical bore wall, said plurality of further ports being grouped but spaced longitudinally of said bore so as to be progressively opened to atmospheric pressure as said piston member moves toward the bore closed end or progressively closed off as said piston member moves towards the open end, movement of said piston member towards the bore closed end being controlled by fall of the water in said reservoir and there being further bleed means enabling a small proportion of the higher pressure inlet water to enter said bore at the closed end part thereof for movement of said piston member towards the opposite end of said bore.

5. A water supply system as claimed in claim 4 wherein said piston member has an open ended co-axial bore extending longitudinally therethrough, and a valve seat provided at the end of the piston member directed towards the substantially closed end of the piston member bore, there being a further valve member mounted so as to be closable on said seat on higher pressure water being admitted to said bore and said further valve member having a stem extending through and beyond said piston member bore to have an outer end part connected to a co-axial thrust pin projecting beyond said capping part; said thrust pin being located through a clearance aperture in the capping part and being movable inwardly thereto to initially move and open said further valve member against the higher pressure inlet water in the body part bore, and being movable further inwardly by float means of the reservoir falling with water draw off from said reservoir to effect movement of said piston member towards said substantially closed end of the body part bore in progressively opening said further ports to atmospheric pressure and permit progressive opening of the valve members in the valve chambers for the controlled admission of higher pressure inlet water to said reservoir.

6. A water supply system as claimed in claim 1 wherein said bleed means of said equalising valve assembly is provided by way of a small bore extending through each valve member.

7. A water supply system as claimed in claim 1 wherein said divider means of said equalising valve assembly is a flexible diaphragm member incorporating or provided with said valve members for closing the associated port of each valve chamber.

8. A water supply system as claimed in claim 7 wherein said flexible diaphragm member of said equalising valve assembly is made of a resilient material and shaped within each respective valve chamber to have a substantially frusto-conical form with its small end part directed towards said port for sealing engagement thereat under the inherent spring bias of the material on their being equalised pressure between said first and second chamber parts or when the pressure on said second chamber part side of said diagraph member is greater than the pressure on said first chamber part side.

9. A water supply system as claimed in claim 8 wherein said valve body of said equalising valve assembly includes a main body part and a capping part with mating face wall portions, said main body part face wall portion being recessed to define said first chamber parts and said capping part being recessed to define said second chamber parts, and wherein said flexible diaphragm member for each valve chamber is part of a single common diaphragm member of said equalising valve assembly sealingly mounted between said mating face portions of said main body part and said capping part.

10. A water supply system as claimed in claim 9 wherein said body part of said equalising valve assembly is made of substantially cylindrical form with said plurality of valve chambers located in spaced relationship on a concentric pitch circle about the axis of said body part, said capping part and said mating face wall portions being disposed in planes substantially normal to said axis.

* * * * *